United States Patent
Farshizadeh et al.

(10) Patent No.: US 11,465,679 B2
(45) Date of Patent: Oct. 11, 2022

(54) METHOD FOR DETECTING THE PRESENCE OF HANDS ON THE STEERING WHEEL

(71) Applicant: TRW Automotive GmbH, Alfdorf (DE)

(72) Inventors: Emad Farshizadeh, Düsseldorf (DE); Arno Luengen, Cologne (DE)

(73) Assignee: ZF Automation Germany GmbH, Alfdorf (DE)

( * ) Notice: Subject to any disclaimer, the term of this patent is extended or adjusted under 35 U.S.C. 154(b) by 234 days.

(21) Appl. No.: 16/608,496

(22) PCT Filed: May 8, 2018

(86) PCT No.: PCT/EP2018/061885
§ 371 (c)(1),
(2) Date: Oct. 25, 2019

(87) PCT Pub. No.: WO2018/210635
PCT Pub. Date: Nov. 22, 2018

(65) Prior Publication Data
US 2020/0140007 A1     May 7, 2020

(30) Foreign Application Priority Data
May 15, 2017    (DE) .......................... 102017110548.4

(51) Int. Cl.
    *B62D 6/08*      (2006.01)

(52) U.S. Cl.
    CPC ..................................... *B62D 6/08* (2013.01)

(58) Field of Classification Search
CPC ......... B62D 6/08; B62D 15/025; B62D 1/286
See application file for complete search history.

(56) References Cited

U.S. PATENT DOCUMENTS

| | | | |
|---|---|---|---|
| 2011/0098890 A1* | 4/2011 | Lee ........................ | B62D 1/286 701/42 |
| 2017/0029021 A1* | 2/2017 | Lee ........................... | B62D 6/00 |
| 2017/0350777 A1* | 12/2017 | Oschlies ................... | G01L 3/16 |
| 2019/0188592 A1* | 6/2019 | Berntorp ................. | G06N 7/005 |
| 2020/0010111 A1* | 1/2020 | Tsubaki ................ | B62D 6/007 |

FOREIGN PATENT DOCUMENTS

| | | |
|---|---|---|
| DE | 102009028647 A1 | 2/2011 |
| DE | 102010048913 A1 | 6/2011 |
| DE | 102011002997 A1 | 7/2012 |
| DE | 102015016217 A1 | 6/2016 |

\* cited by examiner

*Primary Examiner* — Scott A Reinbold
(74) *Attorney, Agent, or Firm* — Robert James Harwood

(57) ABSTRACT

A method for detecting the presence of a driver's hands on the steering wheel of a motor vehicle is described. By means of a mathematical model, at least one part of a steering system of the motor vehicle is modeled. In addition, a rotational angle of a lower end and/or an upper end of a torsion bar of the steering system is determined. A torque acting on the torsion bar is determined by means of a measuring device and a total torque acting on the steering wheel and a rotational angle acceleration of the steering wheel are estimated by means of a Kalman Filter.

20 Claims, 2 Drawing Sheets

METHOD FOR DETECTING THE PRESENCE OF HANDS ON THE STEERING WHEEL

CROSS-REFERENCE TO RELATED APPLICATION

This application is a national stage of International Application No. PCT/EP2018/061885, filed May 18, 2018, the disclosure of which is incorporated herein by reference in as entirety, and which claimed priority to German Patent Application No. 102017110548.4, filed May 15, 2017, the disclosure of which is incorporated herein by reference in its entirety.

TECHNICAL FIELD

The invention relates to a method for detecting the presence of a driver's hands on the steering wheel of a motor vehicle, in particular a motor vehicle with an electromechanically assisted steering system.

BACKGROUND

In motor vehicles with an electromechanically assisted steering system, the electromechanical steering assistance can act on the steering system with a torque, and in this way, assist the driver while driving or steering the vehicle in a certain direction. In particular, the electromechanical steering assistance can steer the vehicle automatically, i.e. without a corresponding steering movement by the driver in a certain direction, for example, based on data from a camera or other sensors. The automatic steering of motor vehicles is used in particular in control systems, at least partially in motor vehicles that move autonomously.

An example of such a control system are the so-called lane keeping assistance systems, which help the driver to maintain a lane. However, the driver of the motor vehicle should be able to take full control of the motor vehicle again at any time. The presence of the driver's hands on the steering wheel has proved to be a reliable indicator for this purpose.

In the case of fully autonomous motor vehicles, the control system should automatically control the motor vehicle as long as the driver does not want to take control of the motor vehicle himself. When the driver puts his hands on the steering wheel, this is a clear indicator that he wants to take control of the vehicle. On the contrary, if the driver takes his hands off the steering wheel, the automatic control system should take control of the motor vehicle.

Therefore, it is necessary in both cases to be able to detect the presence of the driver's hands on the steering wheel. One way to detect the presence of hands on the steering wheel are additional sensors on the steering wheel. The sensors detect, for example, via capacitance measurement whether the hands are on the steering wheel. However, additional sensors generate additional costs.

Therefore, the object of the invention is to provide a method for detecting the presence of hands on the steering wheel, in which no additional sensors are necessary with respect to existing torque sensors and/or angle sensors included in the electromechanically assisted steering system.

SUMMARY

The object is achieved according to the invention via a method of the aforementioned type comprising the following steps:

by means of a mathematical model, at least one part of a steering system of the motor vehicle is modeled, a rotation angle of a lower end and/or an upper end of a torsion bar of the steering system is determined, a torque acting on the torsion bar is determined by means of a measuring device, the total torque acting on the steering wheel and a rotational angle acceleration of the steering wheel are estimated by means of a Kalman Filter, the estimated total torque acting on the steering wheel and the estimated rotational angle acceleration are used to determine a moment of inertia of the steering wheel, and the determined moment of inertia of the steering wheel and a predetermined nominal value of the moment of inertia of the steering wheel are used to determine whether the driver's hands are on the steering wheel.

Since the determined moment of inertia of the steering wheel differs from the predetermined nominal value when the driver's hands are on the steering wheel, it is possible to determine whether the drive's hands are on the steering wheel. The method according to the invention uses only the already existing sensors in the steering system to detect the presence of the driver's hands on the steering wheel, in particular a torque sensor that determines at least the torque acting on the torsion bar. No additional sensors are required, which saves costs.

According to one aspect of the invention, the entire steering system is modeled by means of the mathematical model. In particular, both an upper part of the steering system of the motor vehicle comprising a steering wheel, a steering column with the torsion bar and the measuring device, and also a lower part of the steering system of the motor vehicle are modeled.

According to another aspect, by means of the mathematical model an upper part of the steering system of the motor vehicle is modeled, which comprises a steering wheel, a steering column with the torsion bar and the measuring device.

A further aspect provides that by means of a mathematical model a part of the steering above the torsion bar is modeled, said part comprising the steering wheel.

Preferably, an observer is designed on the basis of the mathematical model, which determines the required non-measured variables and the required non-measurable variables. By "observer" is to be understood an observer in the sense of control technology. The observer determines variables that are needed to determine the moment of inertia of the steering wheel, but said variables are not measured or can not be measured. The rotation angle of the lower end of the torsion bar can be determined, more specifically, it can be measured by an angular position sensor of an auxiliary motor of the electromechanically assisted steering system.

Preferably, the determined moment of inertia of the steering wheel and the predetermined nominal value of the moment of inertia of the steering wheel are compared to determine whether the driver's hands are on the steering wheel. In particular, it is detected that the driver's hands are on the steering wheel when the moments of inertia differ by more than a predetermined value. This predetermined value may be selected in a manner that a recognition error rate is less than 10%, preferably less than 5%, more preferably 0%. In this way, it can be detected with the necessary accuracy, whether the driver's hands are on the steering wheel.

More preferably, the moments of inertia are compared by calculating the difference between the two moments of inertia. In particular, it is detected that the driver's hands are on the steering wheel when the difference between the moments of inertia differs by more than a predetermined value of zero. This predetermined value may be selected in a manner that a recognition error rate is less than 10%, preferably less than 5%, more preferably 0%. In this way, it can be detected with the necessary accuracy, whether the driver's hands are on the steering wheel.

According to one aspect of the invention, a state of the steering wheel is modeled by a linear state-space model. In particular, the linear state-space model provides the basis for the design of an observer. By "observer" is to be understood an observer in the sense of control technology. The observer determines variables that are needed to determine the moment of inertia of the steering wheel, but said variables are not measured or cannot be measured.

According to a further aspect of the invention, the measuring device determines the torque acting on the torsion bar from a relative angle between an upper end and the lower end of the torsion bar. Since the torque acting on the torsion bar is measured anyway, especially in electromechanically assisted steering systems, already existing sensors of the steering system can be used. Therefore, no further components are necessary, resulting in cost savings.

Preferably, the moment of inertia of the steering wheel is determined from a differential equation that describes the relationship between the moment of inertia of the steering wheel, the rotational angle acceleration of the steering wheel and the estimated total torque acting on the steering wheel. Since the Kalman Filter estimates all the necessary variables, the moment of inertia of the steering wheel in this embodiment of the invention can be easily determined.

One aspect of the invention additionally provides that a rotational angle of the steering wheel is determined, more specifically, it is measured. In particular, a rotation angle of the upper end of the torsion bar is determined or measured, and equated with the rotation angle of the steering wheel. The rotation angle of the steering wheel in this embodiment of the invention, therefore, must not only be reconstructed by the Kalman Filter, but also must be immediately available in particular as a measured variable.

More specifically, the measuring device measures the rotation angle of the lower end and/or the upper end of the torsion bar. If the measuring device measures only one of the two rotation angles, the other rotation angle can be reconstructed from the measured rotation angle and from the determined torque acting on the torsion bar. In particular, the rotation angle of the upper end of the torsion bar can be equated with the rotation angle of the steering wheel. In this embodiment of the invention, no additional measuring device is necessary for measuring the rotation angle, resulting in a simpler construction of the steering system.

In accordance with one embodiment of the invention it is provided that the upper part of the steering system is modeled as a mass with a spring and/or damping element in the mathematical model. By appropriate tuning of model parameters, in particular of spring and damping coefficients, the upper part of the steering system can be modeled as realistically as possible.

According to another embodiment of the invention, the modeled part of the steering system is modeled as a mass in the mathematical model. This is particularly advantageous when the rotation angle of the upper end of the torsion bar is measured. The simplified model of the upper steering system is then sufficient to determine with enough precision the torque acting on the steering wheel. The calculation effort is reduced in this embodiment of the invention.

BRIEF DESCRIPTION OF THE FIGURES

Further advantages and features of the invention will become apparent from the following description and the drawings to which reference is made. In which are shown.

DETAILED DESCRIPTION

Figure 1:
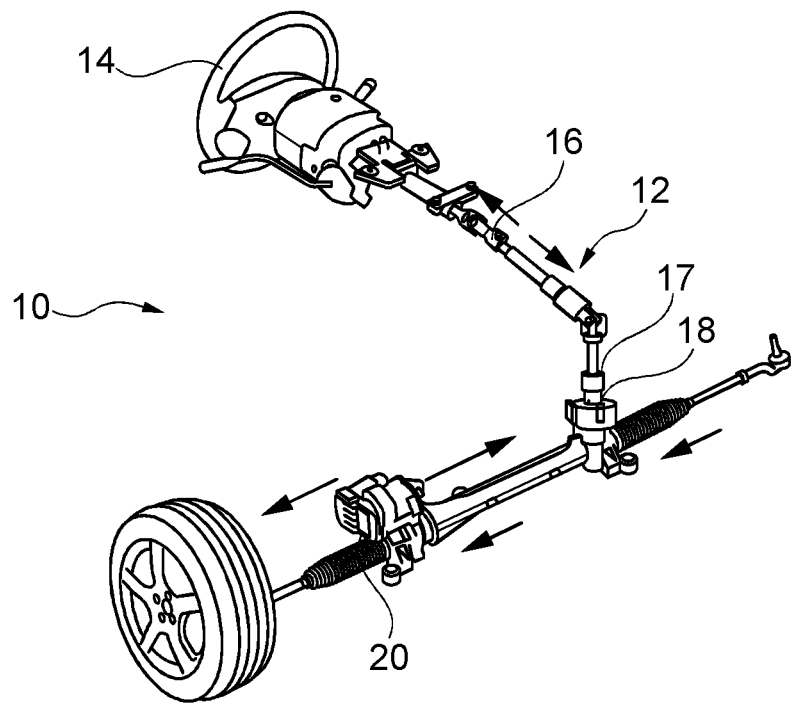
FIG. 1 shows a perspective view of a steering system of a motor vehicle.

A steering system 10 shown in FIG. 1 of a motor vehicle is designed as an electromechanically assisted steering system. The steering system 10 comprises an upper part 12 with a steering wheel 14, a steering column 16 with a torsion bar 17, and a measuring device 18 and a lower portion with an auxiliary motor 20.

The driver acts on the steering wheel 14 with a torque, so that the steering column 16 is rotated. The measuring device 18 determines a torque acting on the torsion bar 17 from a relative angle between an upper (laterally to the steering wheel) end and a lower end of the torsion bar 17. In addition, an angular position sensor of the auxiliary motor 20 determines a rotation angle of the lower end of the torsion bar 17.

Based on the determined torque acting on the torsion bar 17 and on the rotation angle of the lower end of the torsion bar 17, the auxiliary motor 20 is controlled in a manner that it provides a suitable supporting torque for steering the vehicle.

In at least partially autonomous motor vehicles, it is necessary that the motor vehicle can detect whether the driver's hands are on the steering wheel 14. In the method described below, only measured variables are used, which were already measured by the measuring device 18 and the angular position sensor of the auxiliary motor 20 of the steering system 10, more precisely, the rotation angle of the lower end of the torsion bar 17 and the torque acting on the torsion bar 17.

Figure 2:
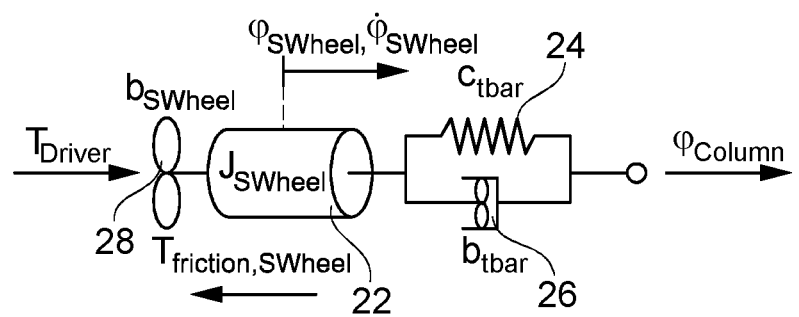
FIG. 2 shows a physical analogous model of an upper part of the steering system of FIG. 1.

The upper part 12 of the steering system 10 is first modeled according to the physical analogous model shown in FIG. 2. In this model, a system comprising the steering wheel 14, the steering column 16 with the torsion bar 17, and the measuring device 18 is modeled by a mass 22 with a moment of inertia $J_{SWheel}$, a spring 24 with a spring coefficient $c_{tbar}$ and a damping material 26 with a damping coefficient $b_{tbar}$. In this case, the spring 24 and the material damping 26 are modeling the torsion bar 17.

In addition, it is factored that via a damping element 28 with damping coefficient $b_{SWheel}$, the torque $T_{Driver}$ with which the driver acts on the steering wheel 14 is damped by viscous friction, in particular by bearing friction on the steering wheel 14. A total induced counter-torque $T_{friction}$ in the upper part 12 of the steering system 10 counteracts the torque $T_{Driver}$ by means of Coulomb friction.

Equations can be deduced from the physical analogous model, which constitute a mathematical model of the upper part 12 of the steering system 10. This is explained in more detail below.

A state of the steering wheel 14 is then modeled with a linear state-space model. By "state" is to be understood a minimum set of variables $\vec{x}$, which are required to describe the system. Here, the state of the steering wheel 14 is observed. The relevant state variables are the rotation angle $\varphi_{SWheel}$ and the rotation angle speed $\dot{\varphi}_{SWheel}$ of the steering wheel 14. Then, in particular, the formula is:

$$\vec{x} = \begin{pmatrix} \varphi_{SWheel} \\ \dot{\varphi}_{SWheel} \end{pmatrix}.$$

The fact that the state is dependent upon time is not explicitly shown below, but assumed implicitly. The time development of the state of the steering wheel 14 is given by the following equation:

$$\dot{\vec{x}} = A\vec{x} + B\vec{u} = A\begin{pmatrix} \varphi_{SWheel} \\ \dot{\varphi}_{SWheel} \end{pmatrix} + B\begin{pmatrix} u_{control} \\ u_{dist} \end{pmatrix}.$$

This equation represents a differential equation or a difference equation, depending on whether a continuous time evolution or a discrete time evolution is observed. Here $u_{control} = \varphi_{column}$ represents in this embodiment the determined (known) rotation angle of the angle position sensor of the lower end of the torsion bar 17. Also, $u_{dist} = T_{Driver} + T_{friction}$ represents the (unknown) sum of the torque with which the driver acts on the steering wheel 14, and the counter-torque due to the Coulomb friction.

$u_{dist}$ describes an unknown disturbance of the state, occurring in the upper part 12 of the steering system 10. The matrices A and B describe the development of the state $\vec{x}$ and are dependent upon the parameters of the mathematical model.

As already mentioned, the measuring device 18 determines the torque acting on the torsion bar 17 from the relative angle between the upper end and the lower end of the torsion bar 17, which is referred to below with $T_{tbar}$. The measured torque $T_{tbar}$ is related to the state of the steering wheel 14 via the following equation:

$$T_{tbar} = C\vec{x} + D\vec{u}.$$

Here, the matrices C and D describe the relation between the current state $\vec{x}$ of the steering wheel 14, the partly known and partly unknown input variables $\vec{u}$ and the measured torque $T_{tbar}$. Together with the above equation for the time evolution of the state of the steering wheel 14, the equation $T_{tbar} = C\vec{x} + D\vec{u}$ forms a linear state space model for the state of the steering wheel.

From the measurement of the rotation angle of the lower part of the torsion bar 17 and from the torque acting on the torsion bar 17, $u_{dist}$ can not be extrapolated directly to the state of the steering wheel 14 and the disturbance variable. Rather, the state of the steering wheel 14 and the disturbance variable $u_{dist}$ must be estimated.

For this purpose, a Kalman Filter is used. Based on the measured variables and the selected mathematical model, this filter estimates the state of the steering wheel 14 and unknown input variables. More specifically, the Kalman Filter estimates the rotation angle $\varphi_{SWheel}$ the steering wheel 14, the rotation angle speed $\dot{\varphi}_{SWheel}$ of the steering wheel 14 and the disturbance $T_{Driver} + T_{friction}$ acting on the upper part 12 of the steering system 10. Furthermore, the rotational angle acceleration $\ddot{\varphi}_{SWheel}$ of the steering wheel 14 is estimated. In addition, the counter-torque induced by viscous friction can be calculated according to $T_{bSWheel} = b_{SWheel} \dot{\varphi}_{SWheel}$ and by the estimation of $\dot{\varphi}_{SWheel}$ by knowing the damping coefficient $b_{SWheel}$.

The movement equation for the part of the steering system 10 above the torsion bar 17 with a cumulated moment of inertia $J_{SWheel}$ is:

$$J_{SWheel}\ddot{\varphi}_{SWheel} = T_{Driver} + T_{friction} - T_{tbar} - T_{bSWheel}$$

Below, for the sake of simplicity the part of the steering system 10 above the torsion bar 17 is referred to as the steering wheel 14. In addition, in the context of the model it is assumed that the rotation angle of the upper end of the torsion bar 17 coincides with the rotation angle of the steering wheel 14.

The movement equation can be solved in accordance with the moment of inertia $J_{SWheel}$ of the steering wheel 14. This means:

$$J_{SWheel} = 1/\ddot{\varphi}_{SWheel}(T_{Driver} + T_{friction} - T_{tbar} - T_{bSWheel})$$

Via the Kalman Filter, all additionally required variables are estimated, which are necessary to calculate the moment of inertia $J_{SWheel}$ of the steering wheel 14. More precisely, all the variables to calculate the moment of inertia of the steering wheel 14 are estimated, including all the required non-measured variables and all the required non-measurable variables.

In the embodiment discussed here, the torque $T_{tbar}$ acting on the torsion bar 17 is measured by the measuring device 18. However, the torque acting on the torsion bar 17 can also alternatively be estimated by the Kalman Filter.

The calculated moment of inertia $J_{SWheel}$ of the steering wheel 14 is now compared with a predetermined nominal value of the moment of inertia $J_{SWheel,nom}$ of the steering wheel 14, in particular by calculating the difference between the two moments of inertia.

The moment of inertia of the steering wheel 14 differs from the predetermined nominal value of the moment of inertia, when the hands (or one hand) of the driver are on the steering wheel 14. Accordingly, it is detected that the hands are on the steering wheel 14 when the moment of inertia of the steering wheel 14 differs by more than a predetermined deviation from the nominal value.

The deviation value may be selected in such a way that a positive error detection rate (it is detected that the hands are on the steering wheel 14, although this is incorrect) and/or a negative error detection rate (it is not detected that the hands are on the steering wheel 14, although this is not the case) is each below 10%, preferably less than 5%, particularly preferably 0%.

Figure 4:
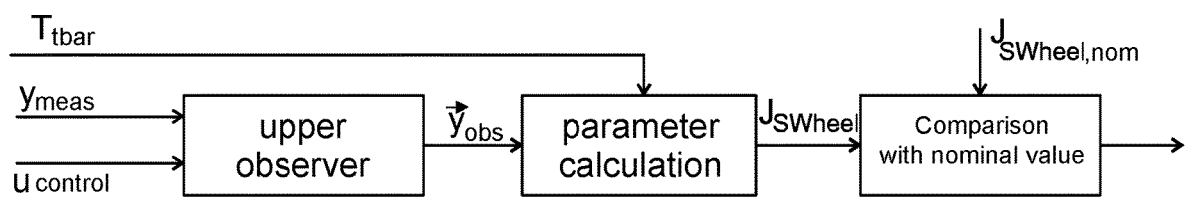
FIG. 4 shows a schematic representation of the steps of the method according to the invention.

In other words, the method described above is based on an observer in the sense of control technology, as illustrated in FIG. 4. A real system comprising the steering wheel 14, the steering column 16 with the torsion bar 17, and the measuring device 18 is simulated as described above by a mathematical model. This mathematical model serves as the basis for designing the observer. From known input variables and measured variables $u_{control}$ or $y_{meas}$, unknown state variables and input parameters $\vec{y}_{obs}$ are estimated by the observer ("upper observer" in FIG. 4) as described above. From this, a parameter $J_{SWheel}$ is calculated together with the measured variable $T_{tbar}$ ("Parameter calculation" in FIG. 4) and compared with a nominal value ("comparison with nominal value" in FIG. 4).

The rotation angle of the steering wheel 14 can alternatively be determined as follows. From the rotation angle determined by the angular position sensor of the lower end of the torsion bar 17, and the measured torque acting on the torsion bar 17, the rotation angle of the upper end of the torsion bar 17 can be reconstructed by solving the equation $$T_{tbar}=c_{tbar}\Delta\varphi$$

according to the rotation angle of the upper end of the torsion bar 17, wherein $\Delta\varphi$ represents the difference between the rotation angle of the upper end and the lower end of the torsion bar 17. In the context of the model used, the rotation angle of the upper end of the torsion bar 17 can be set equal to the rotation angle of the steering wheel 14. The rotation angle of the steering wheel 14 is then available for further calculations and does not need to be estimated by the Kalman Filter.

If the measuring device 18 of the steering system 10 is designed in such a way that in addition to the torque acting on the torsion bar 17 it can also measure the rotation angle of the lower end and/or the upper end of the torsion bar 17, then there are several simplifications compared to the method described above.

If the measuring device 18 measures the rotation angle of the lower end of the torsion bar 17, this rotation angle can be used immediately as described above for the Kalman Filter or to determine the rotation angle of the upper end of the torsion bar. Then, in particular, it is not necessary to determine the rotation angle of the lower end of the torsion bar from a signal of the angular position sensor of the auxiliary motor 20.

If the measuring device 18 measures the rotation angle of the upper end of the torsion bar 17 (and thus the rotation angle of the steering wheel 14), then this rotation angle is immediately available as a measured variable for further calculations. Therefore, the rotation angle of the steering wheel 14 must in particular not only necessarily be estimated by the Kalman Filter. Similarly, the rotation angles of the upper end and the lower end of the torsion bar 17 are immediately available for further calculations when the measuring device measures these two angles of rotation.

Hereafter, it is assumed that the measuring device 18 is designed in such a way that it measures at least the rotation angle of the upper end of the torsion bar 17, or that the rotation angle of the upper end of the torsion bar 17 can be determined from the rotation angle of the lower end of the torsion bar.

Figure 3:
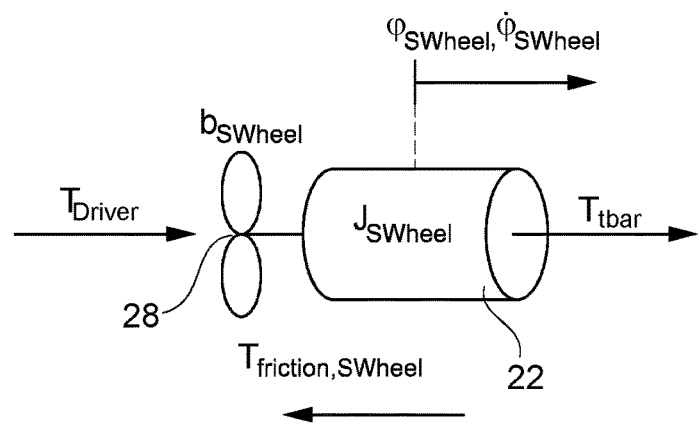
FIG. 3 shows a simplified physical model of the upper part of the steering system of FIG. 1.

The upper part 12 of the steering system 10 can then be modeled by means of a simplified physical analogous model shown in FIG. 3. Compared with the physical analogous model shown in FIG. 2, the spring 24 and the damping material 26 are omitted here. This can simplify determining the torque that is acting on the steering wheel 14 by means of the Kalman filter.

As described above, the rotation angle of the steering wheel 14 is available as a measured variable and does not need to be estimated only via the Kalman Filter. In this case, the measured variable is the rotation angle of the steering wheel 14, then $y_{meas}=\varphi_{SWheel}$. The known input variable is the torque acting on the torsion bar, so it applies $u_{control}=T_{tbar}$. The moment of inertia of the steering wheel 14 can then be determined analogously to the method described above and compared with a nominal value.

With respect to the remaining features and other steps and advantages of the method, please refer to the above explanations.

The invention claimed is:

1. A method for detecting the presence of a driver's hands on a steering wheel of a motor vehicle, in particular a motor vehicle with an electromechanically assisted steering system, comprising the following steps:

by means of a mathematical model, at least one part of a steering system of the motor vehicle is modeled, a rotation angle of a lower end and/or an upper end of a torsion bar of the steering system is determined, a torque acting on the torsion bar is determined, an estimated total torque acting on the steering wheel and an estimated rotational angle acceleration of the steering wheel are determined by means of a Kalman Filter, the estimated total torque acting on the steering wheel and the estimated rotational angle acceleration are used to determine a moment of inertia of the steering wheel, and the determined moment of inertia of the steering wheel and a predetermined nominal value of the moment of inertia of the steering wheel are used to determine whether the driver's hands are on the steering wheel.

2. The method according to claim 1, wherein by means of the mathematical model the entire steering system is modeled.

3. The method according to claim 1, wherein by means of the mathematical model an upper part of the steering system of the motor vehicle is modeled, which comprises at least a steering wheel and a steering column with the torsion bar.

4. The method according to claim 1, wherein by means of a mathematical model a part of the steering above the torsion bar is modeled, said part comprising the steering wheel.

5. The method according to claim 1, further comprising creating the Kalman Filter based on the mathematical model.

6. The method according to claim 1, wherein the determined moment of inertia of the steering wheel and the predetermined nominal value of the moment of inertia of the steering wheel are compared to determine whether the driver's hands are on the steering wheel.

7. The method according to claim 6, wherein the moments of inertia are compared by calculating the difference of the two moments of inertia.

8. The method according to claim 1, wherein a state of the steering wheel is modeled by means of a linear state-space model.

9. The method according to claim 1, wherein the torque acting on the torsion bar is determined from a relative angle between an upper end and the lower end of the torsion bar.

10. The method according to claim 1, wherein the moment of inertia of the steering wheel is determined from a differential equation that describes the relationship between the moment of inertia of the steering wheel, the rotational angle acceleration of the steering wheel and the estimated total torque acting on the steering wheel.

11. The method according to claim 3, wherein the upper part of the steering system is modeled as a mass with a spring and/or at least one damping element in the mathematical model.

12. The method according to claim 1, wherein at least one angle sensor measures the rotation angle of the lower end and/or the upper end of the torsion bar.

13. The method according to claim 1, wherein the modeled part of the steering system is modeled as a mass in the mathematical model.

14. The method according to claim 1, wherein a rotational angle of the steering wheel is determined as a function of the rotational angle of the upper end and/or the lower end of the torsion bar, the determined moment of inertia of the steering wheel being further determined by using the determined rotational angle of the steering wheel.

15. The method according to claim 1, wherein a rotational angle of the steering wheel is estimated by means of the Kalman Filter, the determined moment of inertia of the steering wheel being further determined by using the estimated rotational angle of the steering wheel.

16. The method according to claim 1, wherein the torque acting on the torsion bar is determined by means of a torque sensor.

17. The method according to claim 1, wherein the torque acting on the torsion bar is an estimated torque determined by means of the Kalman Filter.

18. A method for detecting the presence of a driver's hands on a steering wheel of a motor vehicle, the motor vehicle including an electromechanically assisted steering system having the steering wheel, a steering column with a torsion bar and a torque sensor, and an auxiliary motor with an angular position sensor, the method comprising:
   creating a mathematical model of at least one part of the steering system;
   measuring a rotational angle of a lower end of the torsion bar with the angular position sensor;
   measuring a torque acting on the torsion bar with the torque sensor;
   creating a Kalman Filter based on the mathematical model;
   estimating both a total torque acting on the steering wheel and a rotational angle acceleration of the steering wheel with the Kalman Filter as a function of both the rotational angle of the lower end of the torsion bar and the torque acting on the torsion bar;
   determining a moment of inertia of the steering wheel as a function of both the total torque acting on the steering wheel and the rotational angle acceleration of the steering wheel; and
   comparing the moment of inertia of the steering wheel with a predetermined steering wheel moment of inertia value to determine whether the driver's hands are on the steering wheel.

19. The method according to claim 18, wherein the auxiliary motor provides a supporting torque for steering the motor vehicle based on both the torque acting on the torsion bar and the rotational angle of the lower end of the torsion bar.

20. The method according to claim 18, wherein a rotational angle of the steering wheel is either estimated by means of the Kalman Filter or determined as a function of both the torque acting on the torsion bar and the rotational angle of the lower end of the torsion bar, the moment of inertia of the steering wheel being further determined as a function of the rotational angle of the steering wheel.

* * * * *